(12) United States Patent
Riefe et al.

(10) Patent No.: US 7,827,880 B2
(45) Date of Patent: Nov. 9, 2010

(54) STEERING COLUMN ASSEMBLY WITH A QUICK RELEASE BOLT

(75) Inventors: Richard K. Riefe, Saginaw, MI (US); Marvin V. Manwaring, Clio, MI (US); Ray G. Armstrong, Bay City, MI (US); Jason R. Ridgway, Bay City, MI (US); Ravindra Jwalapathy, Saginaw, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1283 days.

(21) Appl. No.: 11/085,380

(22) Filed: Mar. 21, 2005

(65) Prior Publication Data

US 2006/0207379 A1    Sep. 21, 2006

(51) Int. Cl.
  *B62D 1/18* (2006.01)
  *B62D 1/00* (2006.01)
(52) U.S. Cl. .......................................... 74/493; 280/777
(58) Field of Classification Search ................... 74/493; 280/775, 777
  See application file for complete search history.

(56) References Cited

U.S. PATENT DOCUMENTS

| | | | |
|---|---|---|---|
| 3,530,759 A * | 9/1970 | Francis | ........................ 411/391 |
| 3,940,945 A | 3/1976 | Hardmark | |
| 3,960,031 A | 6/1976 | Chometon | |
| 4,616,522 A | 10/1986 | White | |
| 4,862,761 A | 9/1989 | Sander | |
| 4,949,992 A | 8/1990 | Abramczyk | |
| 5,026,092 A | 6/1991 | Abramczyk | |
| 5,052,715 A | 10/1991 | Ervin | |
| 5,082,311 A | 1/1992 | Melotik | |
| 5,209,512 A | 5/1993 | Hancock | |
| 5,390,955 A | 2/1995 | Kaliszewski | |
| 5,402,728 A * | 4/1995 | Garner | ........................ 102/326 |
| 5,673,937 A | 10/1997 | Fevre | |
| 5,673,938 A | 10/1997 | Kaliszewski | |
| 5,769,455 A | 6/1998 | Duval | |
| 5,788,279 A | 8/1998 | Pfannebecker | |
| 5,899,116 A * | 5/1999 | Armstrong et al. | ............ 74/492 |
| 5,944,348 A | 8/1999 | Boyle, III | |
| 5,953,961 A | 9/1999 | Stuedemann | |
| 6,062,100 A | 5/2000 | Sarsfield | |
| 6,099,038 A | 8/2000 | Jurik | |

(Continued)

*Primary Examiner*—Thomas R Hannon
*Assistant Examiner*—Justin Krause
(74) *Attorney, Agent, or Firm*—Cantor Colburn LLP

(57) ABSTRACT

The invention provides a steering column assembly for a vehicle. The steering column assembly includes a steering column operable to adjustably support a steering wheel in the vehicle. The steering column assembly also includes a locking bracket adjacent to the steering column and moveable along a path for collapsing movement. The steering column assembly also includes a locking member supported in two-way movement by the locking bracket between a first position and a second position spaced from one another. In the first position, the locking member locks the locking bracket and the steering column member together. When the locking member is in the second position, the steering column member is moveable relative to the locking bracket. The steering column assembly also includes at least one quick release bolt engaged with the locking bracket to selectively fix the locking bracket with respect to the vehicle. The at least one quick release bolt is selectively divisible into at least two portions independently of the collapsing movement of the locking bracket along the path.

15 Claims, 4 Drawing Sheets

U.S. PATENT DOCUMENTS

| | | |
|---|---|---|
| 6,205,882 B1 | 3/2001 | Jolley |
| 6,227,571 B1 * | 5/2001 | Sheng et al. ................. 280/777 |
| 6,272,945 B1 | 8/2001 | Jolley |
| 6,357,794 B1 | 3/2002 | DuRocher |
| 6,367,840 B1 * | 4/2002 | Duval et al. ................. 280/777 |
| 6,371,519 B1 * | 4/2002 | Jurik et al. ................. 280/777 |
| 6,394,494 B1 | 5/2002 | Jurik |
| 6,419,269 B1 * | 7/2002 | Manwaring et al. ......... 280/775 |
| 6,578,872 B2 * | 6/2003 | Duval et al. ................. 280/777 |
| 6,634,250 B2 | 10/2003 | Schroter |
| 6,659,504 B2 | 12/2003 | Riefe |
| 6,685,225 B2 | 2/2004 | Hancock |
| 6,749,222 B2 * | 6/2004 | Manwaring et al. ......... 280/777 |
| 6,761,376 B2 | 7/2004 | Riefe |
| 2002/0020999 A1 * | 2/2002 | Duval et al. ................. 280/777 |
| 2003/0000330 A1 * | 1/2003 | Murakami et al. ............ 74/492 |
| 2004/0232685 A1 * | 11/2004 | Gatti et al. ................. 280/777 |

* cited by examiner

US 7,827,880 B2

STEERING COLUMN ASSEMBLY WITH A QUICK RELEASE BOLT

FIELD OF THE INVENTION

The invention relates to a steering column for a vehicle and more particularly to a structure and method for connecting a steering column with a vehicle.

BACKGROUND OF THE INVENTION

Steering systems for vehicles often include a steering column adjustable in at least one of tilting adjustment, raking adjustment, or telescoping adjustment. Adjustable steering columns include a locking device to selectively allow and prevent adjusting movement of the steering column. Adjustable steering columns can be engaged with the vehicle to collapse in response to in an impact situation. For example, capsules can be operably disposed between the steering column and the vehicle. The capsules maintain the steering column in place during normal vehicle handling. In an impact situation such as a vehicle crash, the capsules break in response to an impact force and the steering column collapses relative to the vehicle.

SUMMARY OF THE INVENTION

The invention provides a steering column assembly for a vehicle. The steering column assembly includes a steering column operable to adjustably support a steering wheel in the vehicle. The steering column assembly also includes a locking bracket adjacent to the steering column and moveable along a path for collapsing movement. The steering column assembly also includes a locking member supported in two-way movement by the locking bracket between a first position and a second position spaced from one another. In the first position, the locking member locks the locking bracket and the steering column member together. When the locking member is in the second position, the steering column member is moveable relative to the locking bracket. The steering column assembly also includes at least one quick release bolt engaged with the locking bracket to selectively fix the locking bracket with respect to the vehicle. The at least one quick release bolt is selectively divisible into at least two portions independently of the collapsing movement of the locking bracket along the path.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
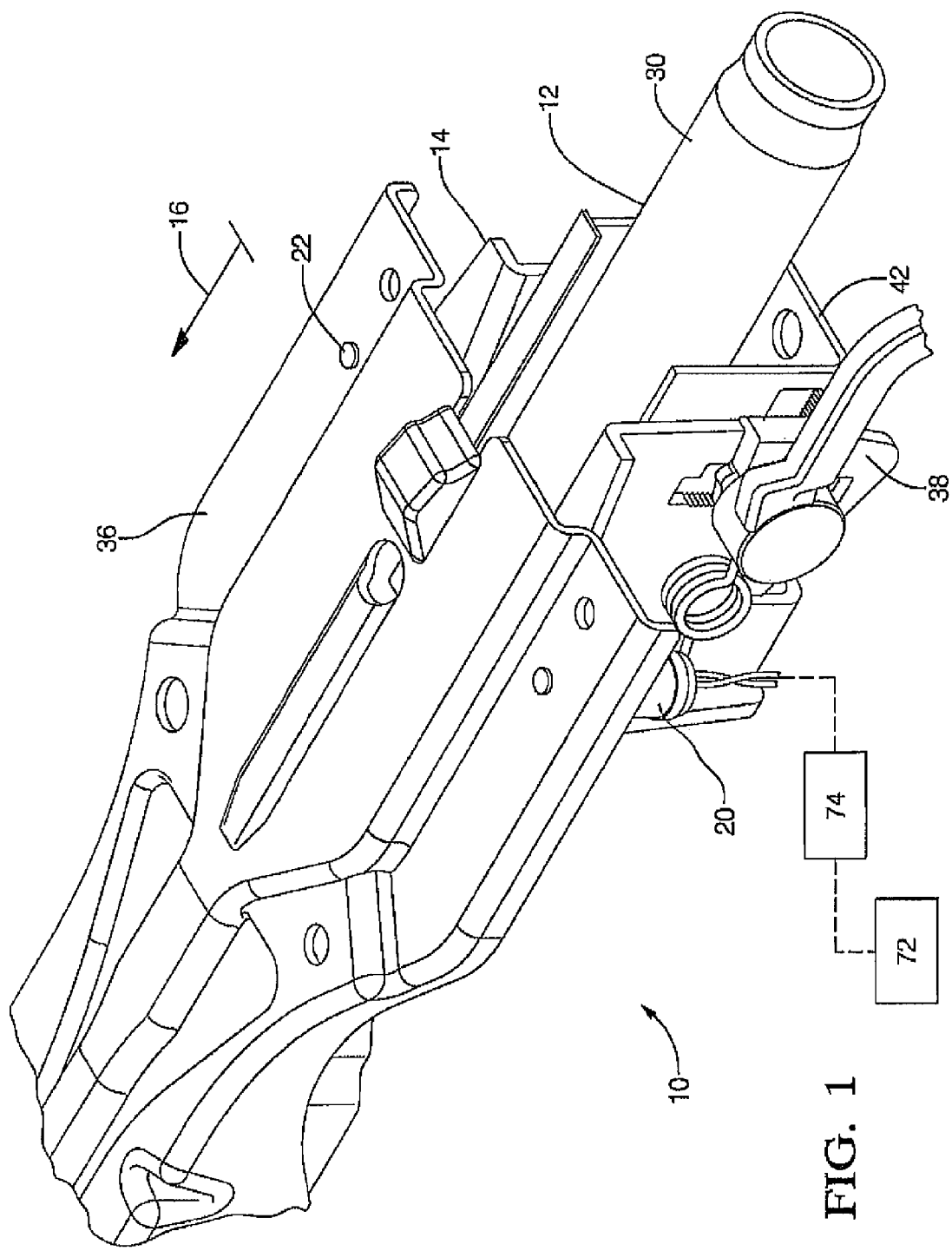
FIG. 1 is a perspective view of the exemplary embodiment of the invention.
Figure 2:
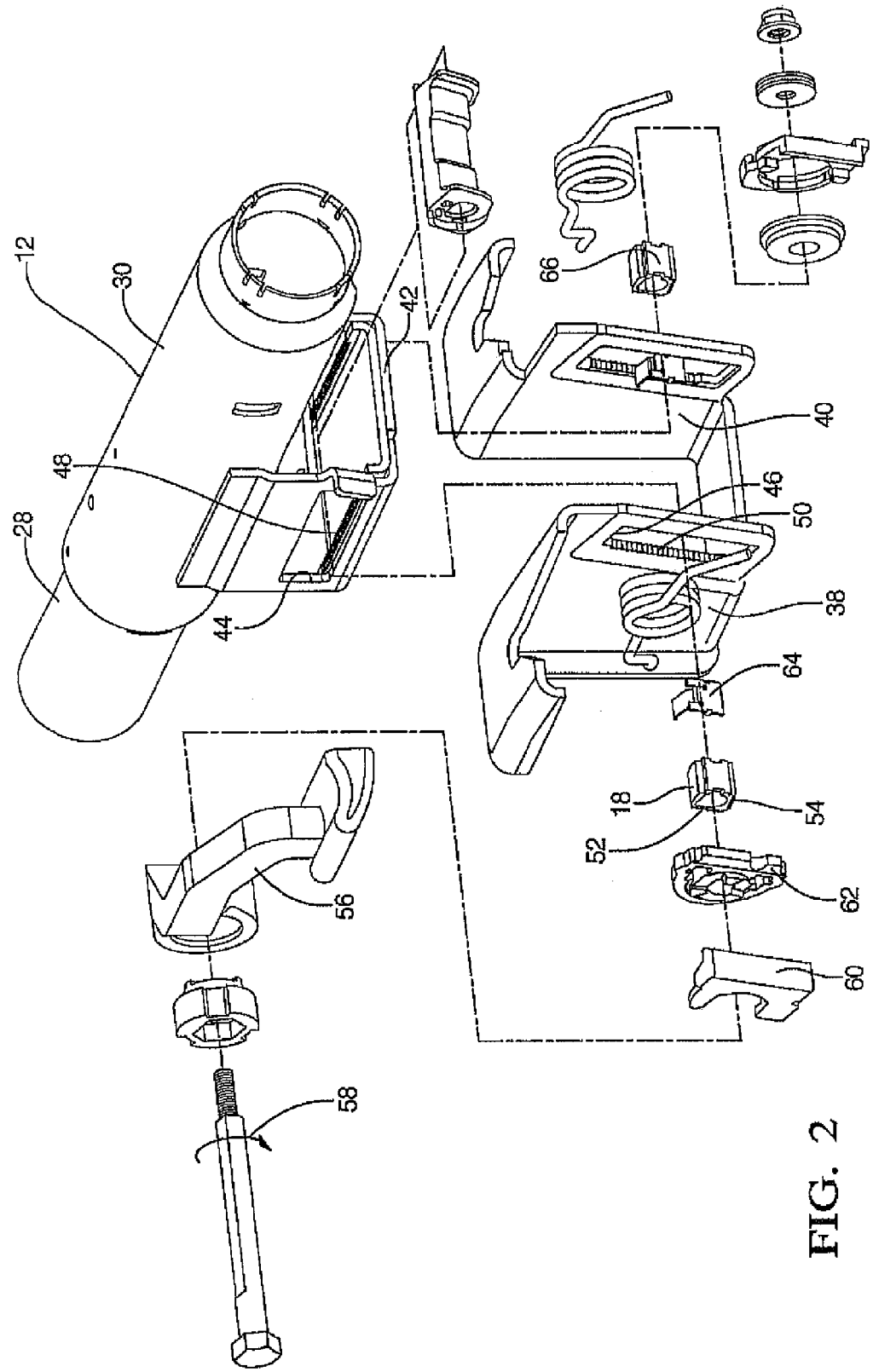
FIG. 2 is an exploded view of a lock of the exemplary embodiment.
Figure 3:
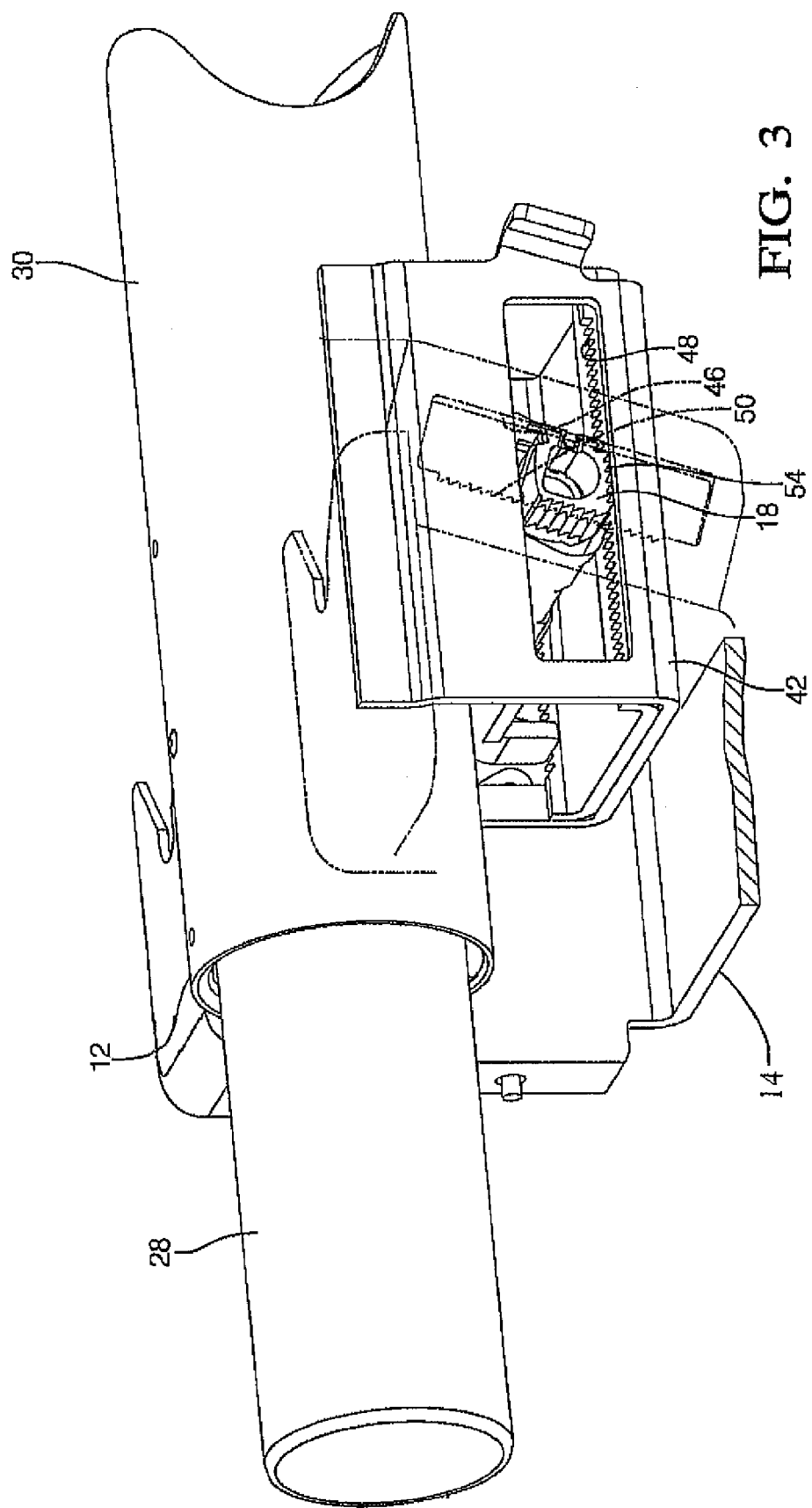
FIG. 3 is a perspective view of the exemplary embodiment with a partial cut-away view.

The invention provides a steering column assembly 10 for a vehicle. The steering column assembly 10 includes a steering column 12 operable to adjustably support a steering wheel in the vehicle. The steering column assembly 10 also includes a locking bracket 14 adjacent to the steering column 12 and moveable along a path 16 for collapsing movement. The steering column assembly 10 also includes a locking member 18 supported in two-way movement by the locking bracket 14 between a first position and a second position spaced from one another. In the first position, the locking member 18 locks the locking bracket 14 and the steering column 12 member together. When the locking member 18 is in the second position, the steering column 12 member is moveable relative to the locking bracket 14. The steering column assembly 10 also includes at least one quick release bolt 20, 22 engaged with the locking bracket 14 to selectively fix the locking bracket 14 with respect to the vehicle. The at least one quick release bolt 20, 22 is selectively divisible into at least two portions 24, 26 independently of the collapsing movement of the locking bracket 14 along the path 16.

Figure 4:
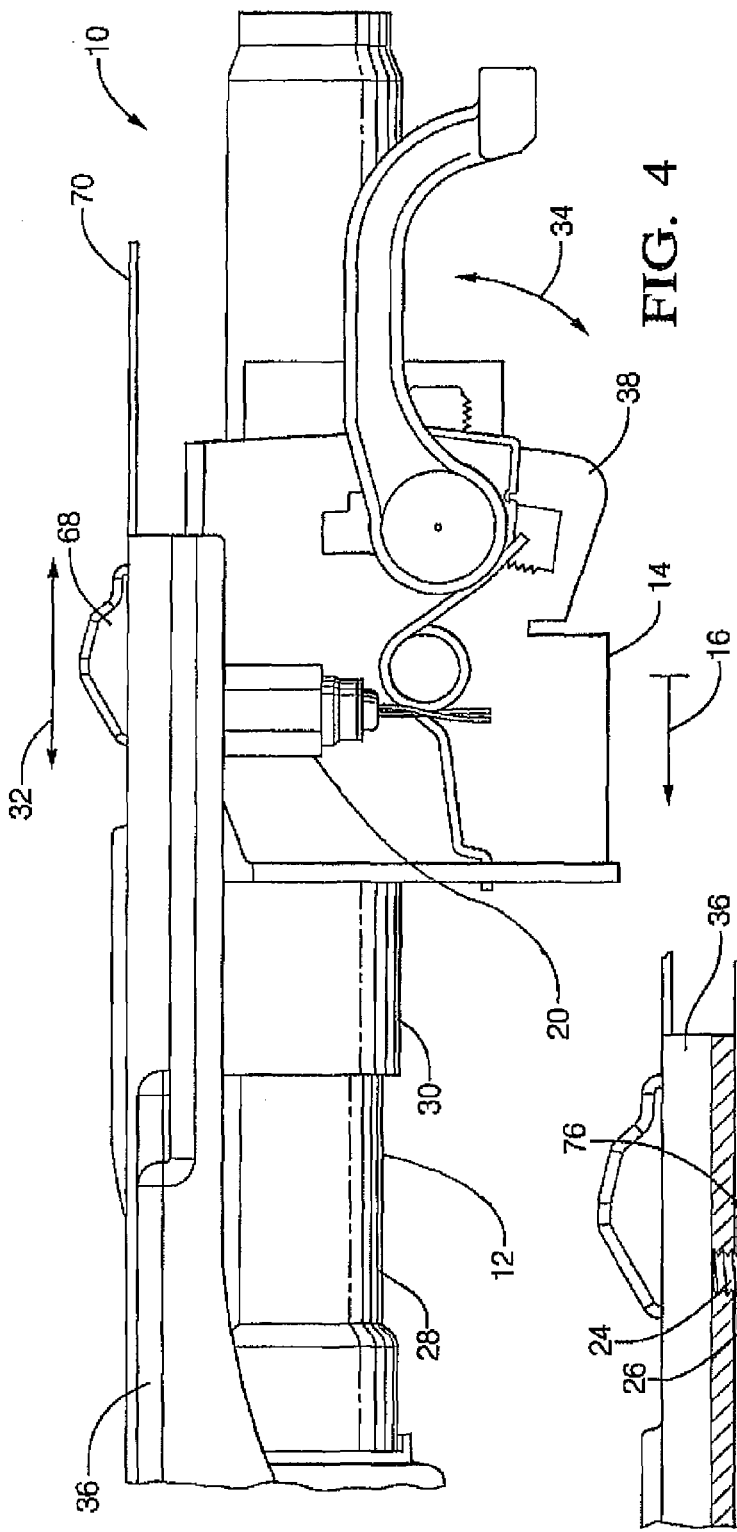
FIG. 4 is a side view of the exemplary embodiment.
Figure 5:
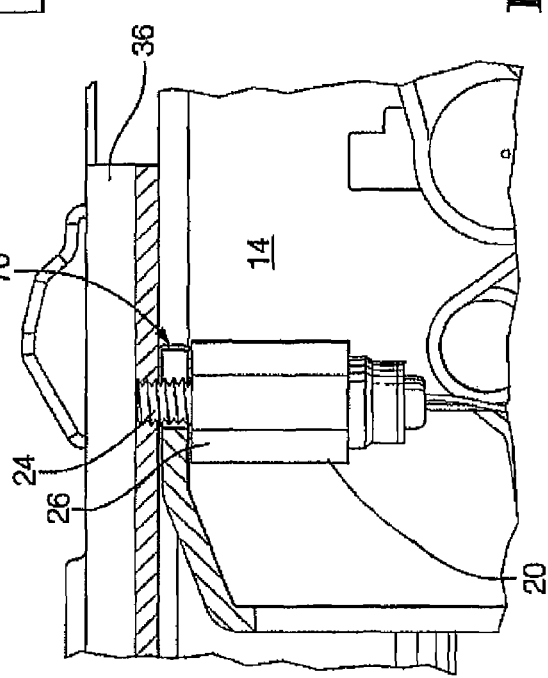
FIG. 5 is a detail view of a quick release bolt of the exemplary embodiment.

In the first exemplary embodiment of the invention, the steering column assembly 10 is positionable in a vehicle and includes first and second members 28, 30 engaged for movement relative to one another along a telescoping path 32 and a raking path 34, best shown in FIG. 4. Both of the first and second members 28, 30 are spaced from and moveable relative to the at least one quick release bolt 20, 22. The first and second members 28, 30 encircle a steering shaft (not shown) of the vehicle.

The locking bracket 14 substantially surrounds the steering column 12 and is releasibly engaged with a fixed portion of the vehicle, such as bracket 36. The locking bracket 14 includes side walls 38, 40. The steering column 12 includes a bracket 42 fixedly engaged with the second member 30 and disposed between the side walls 38, 40. The steering column 12 moves relative to the locking bracket 14 during telescoping and raking movement.

The locking member 18 can prevent both telescoping movement and raking movement of the steering column 12 relative to the locking bracket 14. In alternative embodiments of the invention, the locking member may only prevent one of telescoping movement and raking movement. The exemplary embodiment of the invention includes a pair of second locking members 18, 66 disposed on opposite sides the bracket 42. The operation of the locking member 18 will be described in detail and operation of the locking member 66 is similar. The bracket 42 defines a first slot 44 and the locking bracket 14 defines a second slot 46. The locking member 18 extends through both the first and second slots 44, 46. The locking member 18 is disposed in both the first and second slots 44, 46 during movement between the first and second positions.

The first slot includes a first locking portion 48 and the locking bracket 14 includes a second locking portion 50. The first locking portion 48 of the first exemplary embodiment of the invention defines a plurality of teeth. The second locking portion 50 also defines a plurality of teeth. The locking member 18 includes third and fourth locking portions 52, 54, each defining a plurality of teeth. When the locking member 18 is in the first position, the first locking portion 48 and the fourth locking portion 54 are interlocked and immovably associated with one another. Cooperation between the first locking portion 48 and the fourth locking portion 54 lock the steering column 12 with respect to telescoping adjustment. Also, the second locking portion 50 and the third locking portion 52 are interlocked and immovably associated with one another when the locking member 18 is in the first position. Cooperation between the second locking portion 50 and the third locking portion 52 lock the steering column 12 with respect to raking adjustment. When the locking member 18 is in the second position, the first locking portion 48 and the fourth locking portion 54 are spaced from one another and the second locking portion 50 and the third locking portion 52 are spaced from one another, permitting adjusting movement of the steering column 12.

The locking member 18 of the exemplary embodiment of the invention is moveable with a lever 56. The lever 56 cooperates with a pair of cams 60, 62. In response to rotation of the lever in a first direction, the cams 60, 62 push each other apart and the cam 62 urges the locking member 18 upwardly to separate the first and fourth locking portions 48, 54, as well as forwardly to separate the second and third locking portions 50, 52. In response to rotation of the lever in a second direction opposite the first direction, the cams 60, 62 move closer together and the cam 62 retracts from the locking member 18. A biasing device 64 urges the locking member 18 to the first position. The biasing device 64 urges the locking member 18 downwardly to bring together the first and fourth locking portions 48, 54, as well as rearward to bring together the second and third locking portions 50, 52. In operation, a driver of the vehicle can rotate the lever 56 along an arcuate path of movement 58 to move the locking member 18 between the first position and the second position. When the locking member 18 is moved to the second position, the driver can adjust the position of the steering wheel in the vehicle telescopically and in rake. After the steering wheel has been moved to a desired position, the lever 56 can be rotated back along the path of movement 58 to move the locking member 18 to the first position.

During normal vehicle handling, the locking bracket 14 is fixed to the bracket 36 with the quick release bolts 20, 22. In response to an impact situation, such as a vehicle crash, each of the quick release bolts 20, 22 divides into two portions 24, 26, releasing the locking bracket 14 from the bracket 36. The locking bracket 14 is movable along the path 16 of collapsing movement after each of the quick release bolts 20, 22 divides into two portions 24, 26. The quick release bolt 20 divides into portions 24, 26 to quickly separate the locking bracket 14 from the bracket 36. The portion 24 is relatively fixedly engaged with the bracket 36 and the portion 26 is spaced from the bracket 36. The portion 24 of the exemplary embodiment defines threads engageable with corresponding threads defined by the bracket 36. The portion 26 of the exemplary embodiment includes an incendiary device. If the locking bracket 14 and steering column 12 are locked together, the locking bracket 14 and steering column 12 are moveable concurrently along the path 16 of collapsing movement after each of the quick release bolts 20, 22 divides into the two portions 24, 26. The line of demarcation between the portions 24 and 26 can vary so long as the locking bracket 14 is movable along the path 16 of collapsing movement after each of the quick release bolts 20, 22 divides into the two portions 24, 26. In the exemplary embodiment of the invention, a slip plate 76 is engaged with the locking bracket 14. The slip plate 76 defines an aperture receiving the portion 24 and is pressed between the portion 26 and the bracket 36 during normal vehicle handling. When the incendiary device of the portion 26 is blown, the pressing force on the slip plate 76 dissipates. When the locking bracket 14 moves along the path 16 of collapsing movement, the threaded portion 24 substantially maintains the position with the bracket 36 and the slip plate 76, the threaded portion 24 and the slip plate 76 separating from the locking bracket 14.

In operation, an impact situation such as a vehicle crash can result in the driver being propelled against the steering wheel. This impacting force acts against the steering column 12 also. The quick release bolt 20 can be controlled such that the locking bracket 14 and the steering column 12, which are likely locked together, can move along the collapsing path as soon as an impacting force is applied or slightly before. The steering column assembly 10 can include an energy absorbing device to dissipate energy in response to movement of the steering column 12 and locking bracket 14 along the collapse path 16. The exemplary embodiment of the invention includes an anvil 68 and a strap 70. As best seen in FIG. 4, an anvil 68 is fixed to the bracket 36 and the strap 70 is fixed at one end to either the steering column 12 or the locking bracket 14. The strap 70 is drawn over the anvil 68 during movement of the steering column 12 and locking bracket 14 along the collapse path 16 to dissipate energy and reduce the likelihood of injury to the driver.

The steering column assembly 10 can also include one or more sensors, such as sensor 72, and a controller 74. The sensor 72 is engageable with the vehicle and can sense conditions corresponding to an impact situation, such as vehicle velocity, vehicle acceleration, lateral acceleration, deployment of self inflatable restraint, or any other condition tending to be predicative relative to an impact situation. The sensor 72 communicates sensed conditions to the controller 74. According to programmed logic stored in memory, the controller 74 interprets the conditions sensed by the sensor 72 and, if appropriate, communicates a signal to the quick release bolt 20 to explode, releasing the steering column assembly 10 from the bracket 36. Use of the quick release bolt 20 eliminates variation in release of the steering column assembly 10 from the bracket 36, as may occur in capsules.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steering column assembly for a vehicle comprising:
   a steering column operable to adjustably support a steering wheel in the vehicle;
   a releasably engaged locking bracket adjacent to said steering column and moveable along a path for collapsing movement;
   a locking member supported in two-way movement by said locking bracket between a first position to lock said locking bracket and said steering column member together and a second position spaced from said first position wherein said steering column member is moveable relative to said locking bracket;
   at least one incendiary bolt engaged with said locking bracket to selectively release said locking bracket with respect to the vehicle, said incendiary bolt being a single piece bolt and being selectively divisible into at least two portions independently of said collapsing movement of said locking bracket along said path;
   a sensor configured to sense a vehicle impact condition and to communicate the vehicle impact condition to a controller; and
   the controller configured to transmit a signal to the incendiary bolt to induce the incendiary bolt to divide into the at least two portions, in response to the vehicle impact condition.

2. The steering column assembly of claim 1 said locking member is further defined as being positionable in said first position after said at least one incendiary bolt has divided into said at least two portions such that said locking bracket and said steering column are concurrently moveable along said path of collapsing movement.

3. The steering column assembly of claim 2 wherein said steering column is further defined as having first and second members engaged for movement relative to one another along at least one of a telescoping path and a raking path, wherein both of said first and second members are spaced from said at least one incendiary bolt.

4. The steering column assembly of claim 3 wherein said first and second members are engaged for movement along said telescoping path.

5. The steering column assembly of claim 3 wherein both of said first and second members are moveable relative to said at least one incendiary bolt.

6. The steering column assembly of claim 1 wherein said at least one incendiary bolt is further defined as being spaced from said locking member.

7. The steering column assembly of claim 1 further comprising a support bracket configured for attachment to the vehicle with said at least one incendiary bolt fixing said locking bracket to said support bracket prior to an impact situation and releasing said locking bracket from said support bracket upon occurrence of the impact situation.

8. The steering column assembly of claim 7 wherein said at least one incendiary bolt includes a first portion and a second portion with said first portion remaining coupled to said support bracket after division of said at least one incendiary bolt and said second portion remaining coupled to and moveable with said locking bracket during said collapsing movement of said locking bracket after division of said at least one quick release bolt.

9. The steering column assembly of claim 8 wherein said first portion of said at least one incendiary bolt is in threaded engagement with said support bracket.

10. A collapsible steering column assembly capable of axial movement along a path, the steering column assembly comprising:
an axially extending steering column operable to adjustably support a steering wheel in the vehicle;
a releasably engaged locking bracket adjacent to said steering column and moveable along the path for collapsing movement;
a locking member connecting the locking bracket to the steering column and supported by said locking bracket between a first position and a second position, the second position spaced from the first position, the locking member locking the locking bracket and the steering column to together to prevent telescoping and raking of the steering column in the first position, the locking member allowing telescoping and raking of the steering column in the second position; and
at least one single piece bolt engaged with said locking bracket to selectively release said locking bracket with respect to the vehicle and being selectively fractured into at least two portions to release said steering column for axial movement along the path, said single piece bolt being selectively fractured independently of the collapsing movement of the locking bracket;
a sensor configured to sense a vehicle impact condition and to communicate the vehicle impact condition to a controller; and
the controller configured to transmit a signal to the at least one single piece bolt to induce the at least one single piece bolt to divide into the at least two portions, in response to the vehicle impact condition.

11. The collapsible steering column assembly of claim 10, wherein the at least one single piece bolt is an incendiary bolt.

12. The collapsible steering column assembly of claim 11, wherein the controller initiates a charge signal to the incendiary bolt.

13. The collapsible steering column assembly of claim 10, wherein the controller initiates a signal to the single piece bolt causing it to selectively fracture.

14. A steering column assembly for a vehicle comprising:
an axially extending steering column comprising a first member engaged for telescoping movement with a second member;
a first bracket coupled to both the steering column and a releasably engaged locking bracket, the first bracket having a first slot with a first plurality of teeth;
the releasably engaged locking bracket having a second slot with a second plurality of teeth, and at least a portion of the second slot overlaps the first slot;
a locking member supported by the locking bracket between a first position and a second position, the locking member having a third plurality of teeth and a fourth plurality of teeth, the locking member being positioned at the first position such that the third plurality of teeth engage the first plurality of teeth, and the fourth plurality of teeth engage the second plurality of teeth to lock the locking bracket and the steering column together, the locking member being positioned at the second position such that the third plurality of teeth disengage from the first plurality of teeth, and the fourth plurality of teeth disengage from the second plurality of teeth allowing the steering column to move in an axially extending plane and allowing the steering column to move transversely relative to the axially extending plane;
at least one incendiary bolt having a first position attaching the locking bracket to the vehicle and a second released position, the at least one incendiary bolt having at least two portions in the released position;
a sensor configured to sense a vehicle impact condition and to communicate the vehicle impact condition to a controller; and
the controller configured to transmit a signal to the incendiary bolt to divide into the at least two portions, in response to the vehicle impact condition.

15. The steering column assembly of claim 1, wherein said at least two portions of said incendiary bolt includes a threaded portion and an incendiary device.

\* \* \* \* \*